United States Patent
Weeter et al.

(10) Patent No.: US 8,794,416 B2
(45) Date of Patent: Aug. 5, 2014

(54) CLUTCH ASSEMBLY WITH AN ENERGY CONTROL PLATE

(75) Inventors: Greg Alan Weeter, Ann Arbor, MI (US); William L. Cousins, Ortonville, MI (US); Shachindra Dongaonkar, Bangalore (IN)

(73) Assignee: GM Global Technology Operations, LLC, Detroit, MI (US)

( * ) Notice: Subject to any disclaimer, the term of this patent is extended or adjusted under 35 U.S.C. 154(b) by 169 days.

(21) Appl. No.: 13/471,964

(22) Filed: May 15, 2012

(65) Prior Publication Data

US 2013/0306429 A1 Nov. 21, 2013

(51) Int. Cl.
*F16D 25/08* (2006.01)
*F16D 25/12* (2006.01)

(52) U.S. Cl.
USPC ................... 192/85.51; 192/85.49; 192/113.4

(58) Field of Classification Search
USPC ........... 192/85.49, 85.51, 85.53, 113.1, 113.4
See application file for complete search history.

(56) References Cited

U.S. PATENT DOCUMENTS 6,016,898 A * 1/2000 Duquesnes ................ 192/85.51

FOREIGN PATENT DOCUMENTS

| JP | 2010-091043 A | * | 4/2010 |
| JP | 2010-164110 A | * | 7/2010 |

OTHER PUBLICATIONS

Machine translation of JP 2010-091043 A downloaded from EPO.org on Dec. 27, 2013.*
Machine translation of JP 2010-164110 A downloaded from EPO.org on Dec. 27, 2013.*

* cited by examiner

*Primary Examiner* — Richard M. Lorence

(57) ABSTRACT

A clutch assembly includes a housing, a clutch pack disposed within the housing and concentrically about a shaft, a clutch slave cylinder disposed between the clutch pack and the housing and concentrically about the shaft, and an energy control plate disposed between the clutch slave cylinder and the housing and concentrically about the shaft. The clutch slave cylinder and the energy control plate are generally secured to the housing with a set of fasteners.

6 Claims, 5 Drawing Sheets

CLUTCH ASSEMBLY WITH AN ENERGY CONTROL PLATE

FIELD

The present invention relates to a clutch assembly for a motor vehicle. More specifically, the present invention relates to a clutch assembly with an energy control plate.

BACKGROUND

The statements in this section merely provide background information related to the present disclosure and may or may not constitute prior art.

Clutch assemblies for motor vehicle powertrains provide a frictional, variable torque transmitting coupling between the engine and the transmission. Consequently, heat is generated in the clutch plates. As such, clutch designers typically assume worst case situations, which result in a clutch designs that have large clutch plates, numerous clutch plates, and more robust clutch materials.

Increasing the size of a clutch assembly, however, affects the weight of the clutch and housing and thus the overall weight of the vehicle. Moreover, increased clutch and housing size affects not only the size of the overall powertrain but also its packaging. Specifically, a larger clutch assembly may create additional constraints and lower fuel consumption of the vehicle.

Accordingly, there is a need for a clutch assembly that efficiently dissipates heat without requiring larger clutch components.

SUMMARY

A clutch assembly includes a housing, a clutch pack disposed within the housing and concentrically about a shaft, a clutch slave cylinder disposed between the clutch pack and the housing and concentrically about the shaft, and an energy control plate disposed between the clutch slave cylinder and the housing and concentrically about the shaft. The clutch slave cylinder and the energy control plate are generally secured to the housing with a set of fasteners.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
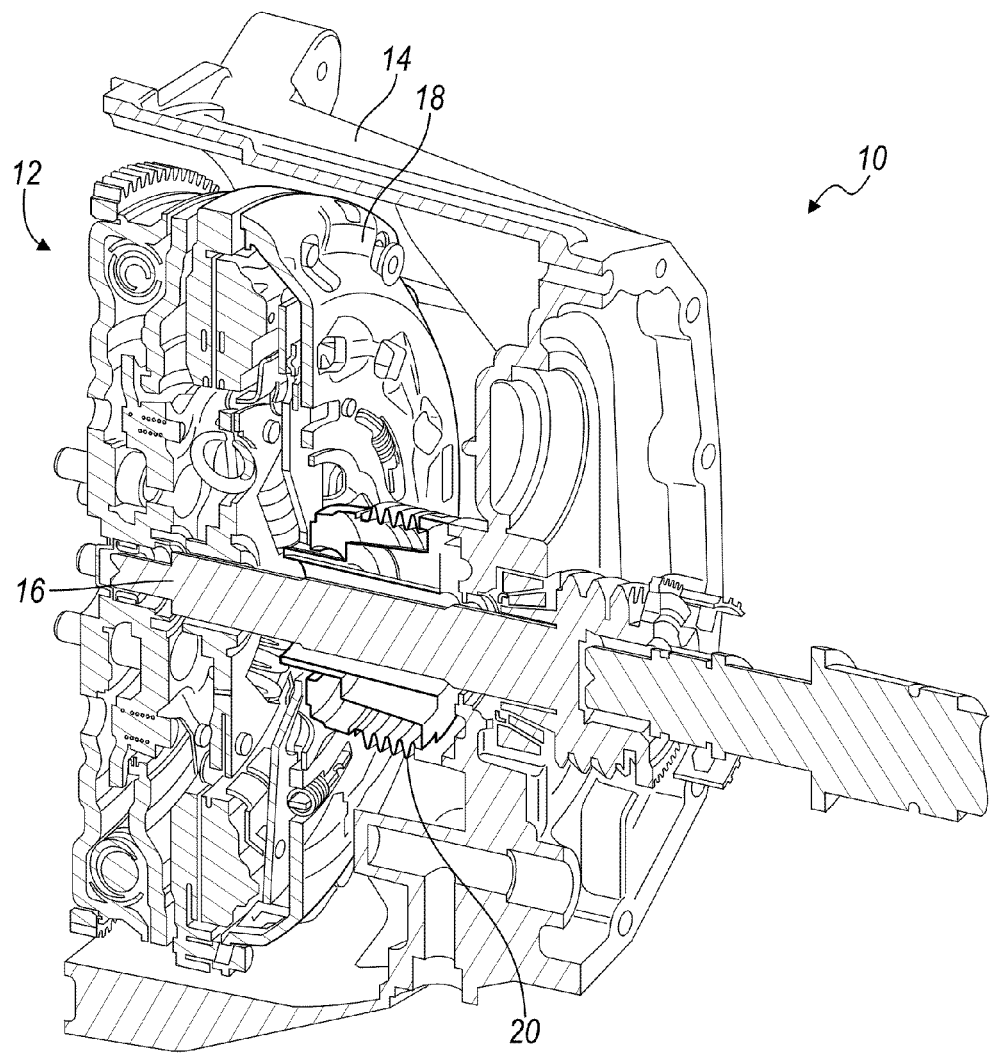
FIG. 1 is a sectional view of a transmission with a clutch assembly in accordance with the principles of the present invention.

Referring now to the drawings, a transmission with a clutch assembly embodying the principles of the present invention is illustrated in FIG. 1 and designated at 10.

The transmission 10 includes a clutch assembly 12 with a clutch pack 18 enclosed in a metal housing 14 which protects the various components of the clutch assembly 12. The clutch assembly 12 is supplied with drive torque from a prime mover such as an internal combustion engine or a hybrid power plant by a crankshaft and supplies drive torque to a transmission through a an output shaft 16. Note that the output shaft 16 extends into a transmission housing (not shown) where it is supported for rotation on an anti-friction roller bearing assembly. An oil seal disposed between the transmission input shaft 16 and the transmission housing provides a fluid tight seal therebetween. It should be understood that the transmission 10 may be either a manual transmission or an automatic transmission. It should be understood that while the clutch pack 18 is herein characterized as a manual clutch, it may either be a manual (directly operator controlled) clutch or a clutch controlled by a hydraulic, pneumatic or electric actuator.

Figure 3:
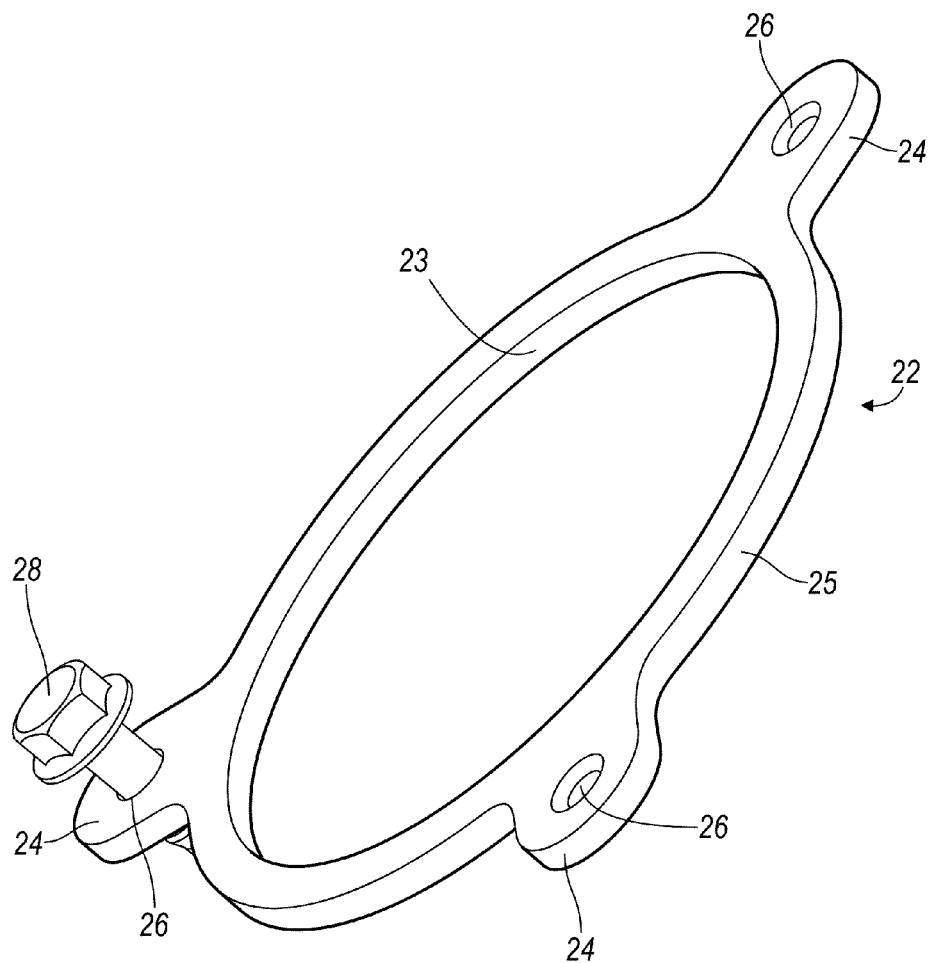
FIG. 3 is a perspective view of the energy control plate.

The clutch pack 18 includes a pair of input side or first clutch plates or disks which are disposed on opposite sides of and in operating, i.e., selective torque transferring, relationship with an output side or second, double sided clutch plate or disk. A clutch slave cylinder 20 is positioned between the clutch pack 18 and the housing 14. The clutch slave cylinder 20 is disposed concentrically about the output shaft 16 and secured to the cast metal housing 14 by a plurality of suitable fasteners, such as, for example, screws or bolts 28 (FIG. 3).

Figure 2:
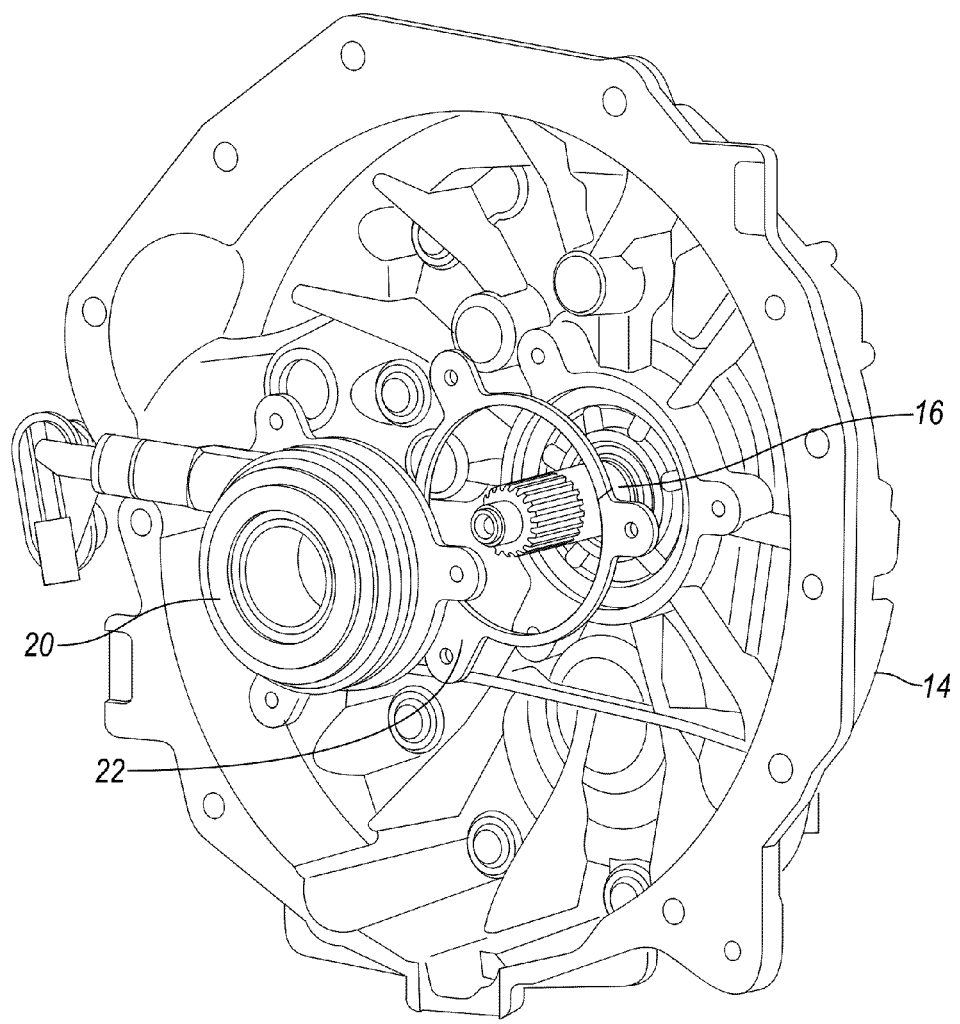
FIG. 2 is an interior view of a housing for the clutch assembly showing an energy control plate in accordance with the principles of the present invention.

Referring now to FIG. 2, an energy control plate 22 is disposed concentrically about the between the clutch slave cylinder 20 and the housing 14. In normal operation of the transmission 10, heat generated by the transmission is conducted through the housing into the hydraulic seals which can distort, causing increased operational friction. The energy control plate 22, however, acts as thermal barrier between the housing 14 and the clutch pack 18.

The energy control plate 22 is generally circular in shape with an inner surface 23 and an outer surface 25. The energy control plate 22 includes a set of flanges such as, for example, the three flanges 24 that extend outwardly from the outer surface 25 shown in FIG. 3. Each flange 24 includes a hole 26 through which a suitable fastener such as the bolt 28 secures the clutch slave cylinder 20 and the energy control plate 22 to the housing 14. The energy control plate 22 is made from a low thermal conductivity material. For example, in some implementations, the energy control plate 22 is made of fiberglass with a thermal conductivity of about 0.04 W/mK.

Figure 4A:
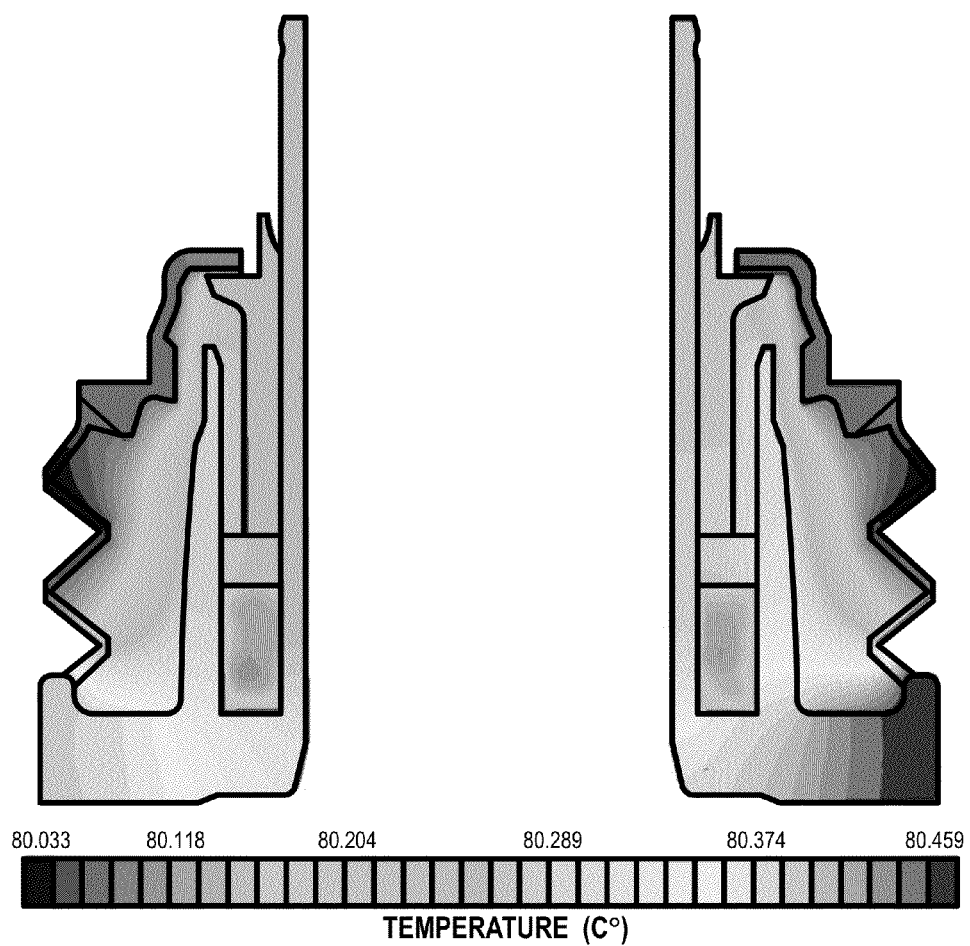
FIG. 4A shows the results of a computational fluid dynamic analysis for a clutch slave cylinder of the transmission of FIG. 1 with the energy control plate.
Figure 4B:
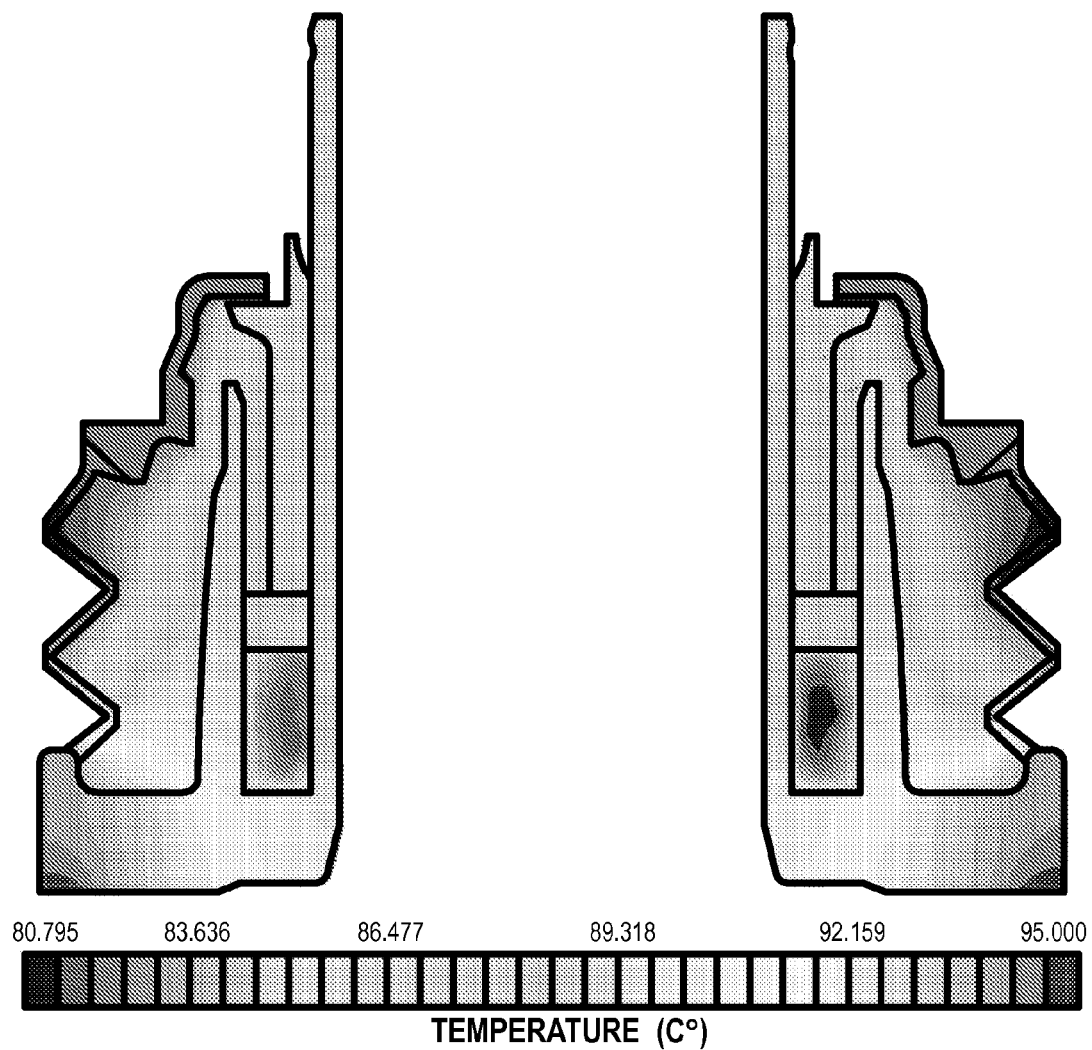
FIG. 4B shows the results of a computational fluid dynamic analysis for a clutch slave cylinder of the transmission of FIG. 1 without the energy control plate.

To determine the benefits of the energy control plate 22, a computational fluid dynamic analysis of the clutch slave cylinder 20 was conducted. The results of the analysis are shown in FIGS. 4A and 4B. Specifically, FIG. 4B illustrates the temperature distribution of the clutch slave cylinder 20 when the energy control plate 22 is not employed, and FIG. 4A illustrates the temperature distribution of the clutch slave cylinder when the energy control plate is employed. In both cases, the temperature of the housing 14 was about 95° C. and the housing air temperature was about 80° C. In the case when the energy control plate 22 is not employed (FIG. 4B), the average oil temperature through the clutch slave cylinder was about 83° C. and the average temperature of the clutch slave cylinder was about 91° C. When the energy control plate 22 is employed (FIG. 4A), however, the average oil temperature through the clutch slave cylinder dropped to about 80° C. and the average temperature of the clutch slave cylinder dropped to about 80° C. as well, clearly illustrating the benefit of using the energy control plate 22.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch assembly comprising:
    a housing;
    a clutch pack disposed within the housing and concentrically about a shaft;
    a clutch slave cylinder disposed between the clutch pack and the housing and concentrically about the shaft; and
    an energy control plate disposed between the clutch slave cylinder and the housing and concentrically about the shaft, the energy control plate having a circular shape and having an outer surface from which a plurality of flanges extend outwardly,
    wherein the clutch slave cylinder and the energy control plate are secured to the housing with a set of fasteners.

2. The clutch assembly of claim 1 wherein the plurality of flanges is three flanges.

3. The clutch assembly of claim 1 wherein each of the plurality of flanges includes a hole through which the fastener passes to secure the energy control plate to the housing.

4. The clutch assembly of claim 1 wherein the energy control plate is made of fiberglass.

5. The clutch assembly of claim 1 wherein the energy control plate is made of a material with a thermal conductivity of about 0.04 W/mk.

6. The clutch assembly of claim 1 wherein the fasteners are bolts.

* * * * *